United States Patent
Cadden

(10) Patent No.: US 7,161,954 B2
(45) Date of Patent: Jan. 9, 2007

(54) TECHNIQUE FOR CONTROLLING SELECTION OF A WRITE ADAPTER FROM MULTIPLE ADAPTERS CONNECTED TO A HIGH SPEED SWITCH

(75) Inventor: William S. Cadden, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 10/156,554

(22) Filed: May 28, 2002

(65) Prior Publication Data

US 2003/0223440 A1    Dec. 4, 2003

(51) Int. Cl.
*H04J 3/16*    (2006.01)
(52) U.S. Cl. ........................... 370/465; 709/202
(58) Field of Classification Search ............. None
See application file for complete search history.

(56) References Cited

U.S. PATENT DOCUMENTS

| | | | | |
|---|---|---|---|---|
| 4,208,715 A | 6/1980 | Kumahara et al. | ........... | 364/200 |
| 4,748,617 A | 5/1988 | Drewlo | ........... | 370/85 |
| 5,051,985 A | 9/1991 | Cidon et al. | ........... | 370/85.005 |
| RE34,528 E | 2/1994 | Franaszek | ........... | 340/825.79 |
| 5,289,579 A | 2/1994 | Punj | ........... | 395/200 |
| 5,341,475 A | 8/1994 | Austruy et al. | ........... | 395/200 |
| 5,432,910 A | 7/1995 | Barker et al. | ........... | 395/275 |
| 5,517,662 A | 5/1996 | Coleman et al. | ........... | 395/800 |
| 5,592,625 A | 1/1997 | Sandberg | ........... | 395/200.08 |
| 5,604,866 A | 2/1997 | Kolb et al. | ........... | 395/200.13 |
| 5,617,547 A | 4/1997 | Feeney et al. | ........... | 395/311 |
| 5,634,015 A | 5/1997 | Chang et al. | ........... | 395/309 |
| 5,659,794 A | 8/1997 | Caldarale et al. | ........... | 395/821 |
| 5,710,944 A | 1/1998 | Rosen et al. | ........... | 395/875 |
| 5,721,871 A | 2/1998 | Ginsberg et al. | ........... | 395/479 |
| 5,867,677 A | 2/1999 | Tsukamoto | ........... | 395/311 |
| 6,047,113 A | 4/2000 | Olnowich | ........... | 395/200.51 |
| 6,072,781 A | 6/2000 | Feeney et al. | ........... | 370/282 |
| 6,094,434 A * | 7/2000 | Kotzur et al. | ........... | 370/401 |
| 6,098,123 A * | 8/2000 | Olnowich | ........... | 710/41 |
| 6,112,252 A | 8/2000 | Hausman et al. | ........... | 709/250 |

(Continued)

FOREIGN PATENT DOCUMENTS

EP    0 982 898 A1    8/1998

OTHER PUBLICATIONS

William S. Cadden, "Technique For Controlling Selection Of A Peek Adapter or A Read Adapter From Multiple Adapters Connected To A High Speed Switch", Serial No. , co-filed herewith,.

*Primary Examiner*—Phirin Sam
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A technique is provided for facilitating writing of messages to multiple adapters connected to a high speed switch in a distributed computing environment. The technique employs a first, relatively quick filter to initially test whether a previously used adapter of the multiple adapters should be used to send a new message. If the first filter fails to select the previously used adapter, then the technique includes employing a second, more complicated filter to determine which adapter of the multiple adapters should be used to send the message. The first filter includes a first set of tests, and the second filter includes a second set of tests.

46 Claims, 12 Drawing Sheets

U.S. PATENT DOCUMENTS 6,233,643 B1    5/2001  Andrews et al. ............ 710/131
6,307,858 B1 * 10/2001  Mizukoshi et al. .... 370/395.71
6,862,682 B1 *  3/2005  Louden et al. ................. 713/2
6,907,001 B1 *  6/2005  Nakayama et al. ......... 370/230

* cited by examiner

TECHNIQUE FOR CONTROLLING SELECTION OF A WRITE ADAPTER FROM MULTIPLE ADAPTERS CONNECTED TO A HIGH SPEED SWITCH

CROSS-REFERENCE TO RELATED APPLICATION

This application contains subject matter which is related to the subject matter of the following application, which is assigned to the same assignee as this application and filed on the same day as this application. The below-listed application is hereby incorporated herein by reference in its entirety:

"TECHNIQUE FOR CONTROLLING SELECTION OF A PEEK ADAPTER OR A READ ADAPTER FROM MULTIPLE ADAPTERS CONNECTED TO A HIGH SPEED SWITCH", by William S. Cadden, Ser. No. 10/156,377,

TECHNICAL FIELD

This invention relates in general to a distributed computer system having a plurality of data processing nodes and one or more switch units which establish links between the plurality of processing nodes, and more particularly, to a technique for controlling selection of an adapter, from multiple adapters, for writing a message to the one or more switch units in order to enhance overall message writing performance.

BACKGROUND OF THE INVENTION

In certain parallel processing systems containing a plurality of data processing nodes, one or more switch units are provided for transferring data between the data processing nodes. A switch unit receives a connection request from one of a plurality of nodes and establishes a link between the data processing node which sends the connection request, and another of the plurality of data processing nodes, which is requested by the connection request. As used herein, a "switch node" means any node of the plurality of data processing nodes which is capable of connecting to such a switch unit. A switch node includes a device driver and at least one adapter.

More particularly, described herein is a control technique for a switch node having multiple adapters. Advantageously, multiple adapters are assumed to write data faster than a single adapter. However, it is recognized herein that a need exists in the art for a control technique for enhancing the process of switching between adapters during the writing of messages. The present invention provides such a selection control technique.

SUMMARY OF THE INVENTION

Although multiple adapters are assumed to write data faster than a single adapter, it has been discovered by applicants that this is not always the case. If the speed at which the data can be written is limited by the path length of the computer program, multiple adapters can actually slow down the writing of data, i.e., the increased path length for switching between adapters slows down the application. This can create a situation where applications actually run slower on multiple adapters than on one adapter. Thus, it has been discovered that a need exists for an effective technique for controlling switching between adapters. This control technique should benefit applications that write more data than one adapter can handle by allowing those applications to use multiple adapters, while at the same time not penalizing applications that do not write data faster than one adapter can handle.

In view of the above, provided herein in one aspect is a method of selecting an adapter of multiple adapters of a switch node for transmission of a message. The method includes: employing a first filter to initially test whether a previously used adapter of the multiple adapters should be used to send a message; and if the first filter fails to select the previously used adapter, then employing a second filter to determine which adapter of the multiple adapters should be used to send the message. In one embodiment, the second filter is more complicated and time consuming than the first filter.

The first filter may comprise a set of tests, including one or more of the following: determining whether the previously used adapter has sufficient resources to handle the message at this time; determining a switch count to ascertain whether the message should be sent through the previously used adapter; ascertaining that the message is not a first message of a group of messages; and determining that the previously used adapter is currently operational.

Systems and computer program products corresponding to the above-summarized methods are also described and claimed herein.

In one aspect, presented herein is a technique for facilitating writing of messages to multiple adapters connected to a high speed switch in a distributed computing environment. The technique, which employs minimizing overhead in switching between adapters in order to enhance performance, can be utilized in a program interface that allows application programs to write to multiple adapters with the same interface used to write to one adapter.

Disclosed herein is an effective technique for switching between adapters which benefits applications that write more data than one adapter can handle by allowing those applications to use multiple adapters, while at the same time not penalizing applications that do not write faster than one adapter can handle. This is accomplished by limiting the path lengths for switching between adapters to the point where no application suffers by using multiple adapters, and many applications benefit. Using the technique presented herein, applications can use multiple adapters expecting to perform at the same or greater speed than possible using a single adapter.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
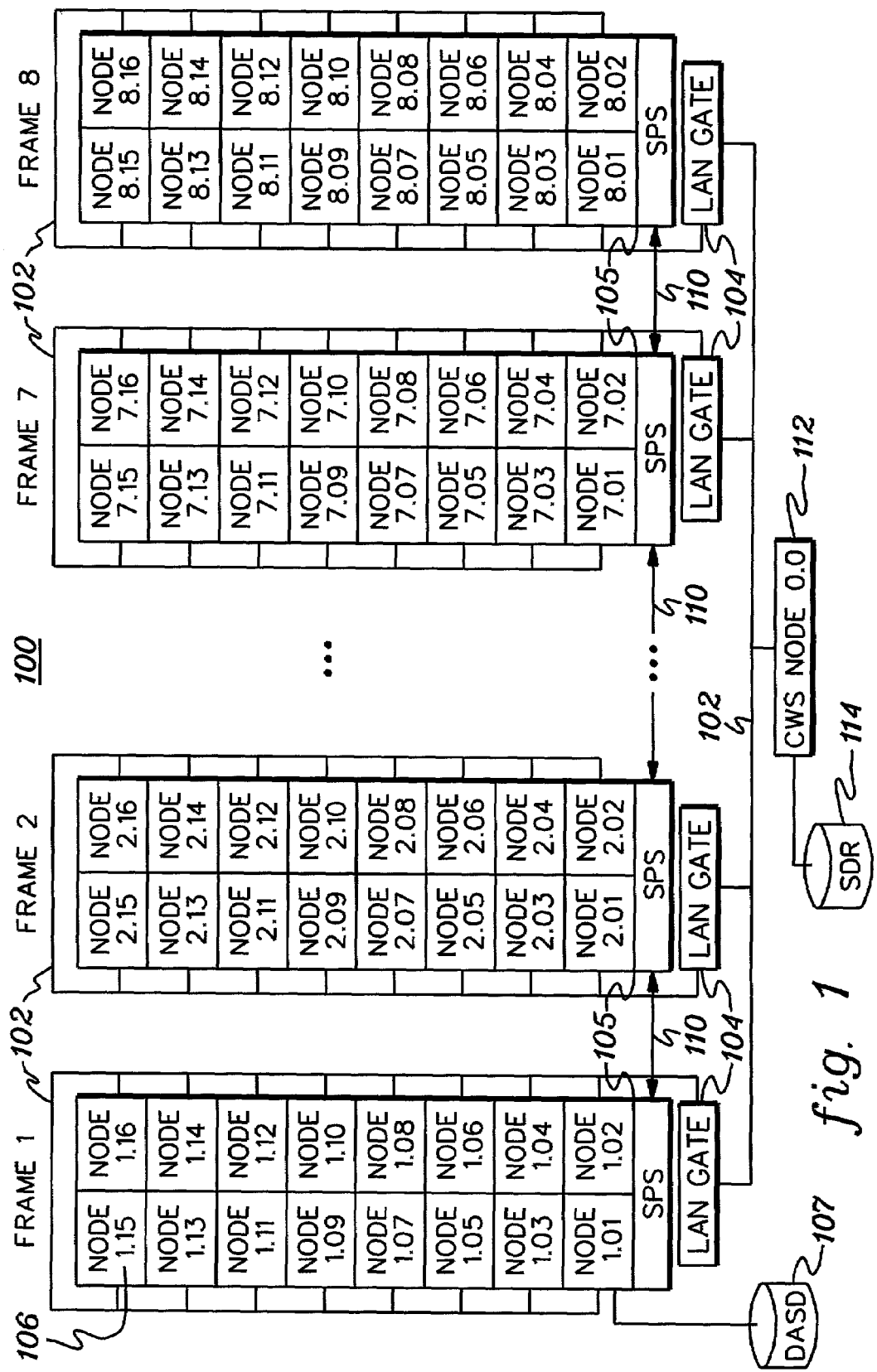
FIG. 1 depicts one example of a distributed communications environment incorporating and using one or more aspects of the present invention.

FIG. 1 is a schematic diagram of a distributed computer system 100 incorporating and using aspects of the present invention. As one example, the distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computing environment having a total of 8 frames, with each frame having up to 16 processing nodes, for a total of 128 nodes. All of the nodes 106 are joined by a local area network (LAN) 102. Each processing node 106 is a computer itself, and may (for instance) be a RISC System/6000 computer running AIX, a UNIX based operating system well-known by those skilled in the art.

All of the nodes in a frame of the SP computer 100 are included in a LAN segment which is joined by the other LAN segments through LAN gates 104. As examples, each LAN gate 104 includes either a RISC/6000 computer, any computer network connected to the LAN or a network router. However, these are only examples. It will be apparent to those skilled in the art that there are other types of LAN gates and that other mechanisms can be used to couple the frames to one another.

Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102, while messages and data may be sent from one to another of the nodes 106 by means of the high performance switches 105.

The distributed computing environment of FIG. 1 is only one example. It is possible to have more or less than 8 frames, or more or less than 16 nodes per frame. Further, the processing nodes do not have to be RISC/6000 computers running AIX. Some or all of the processing nodes can include different types of computers and/or different operating systems. Further, aspects of the invention are usable with other types of communications environments. All of these variations are considered a part of the claimed invention.

Figure 2:
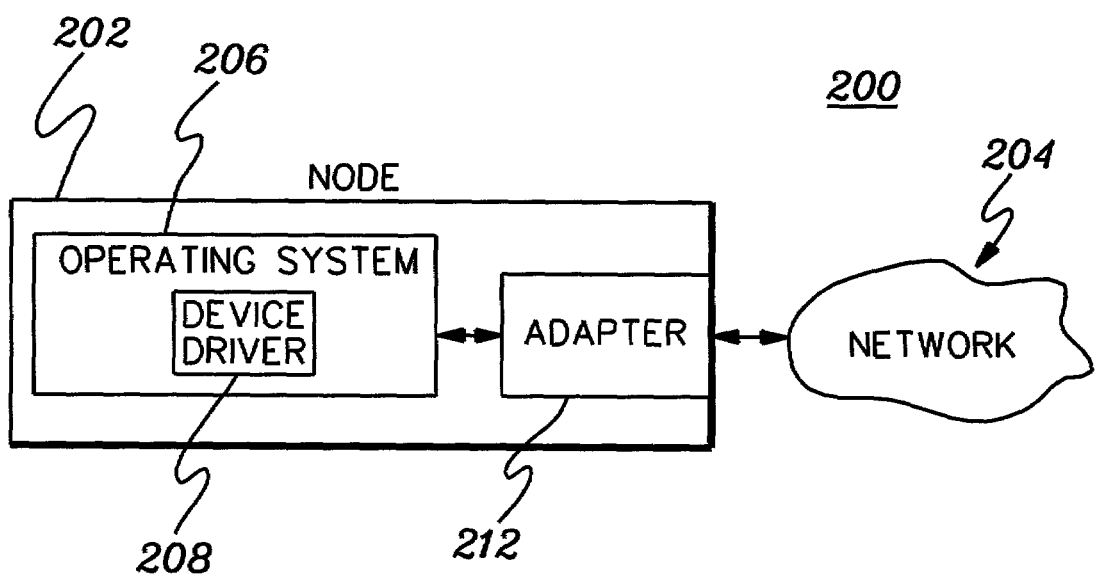
FIG. 2 depicts further details regarding a node of the distributed communications environment of FIG. 1.

FIG. 2 depicts a more detailed embodiment of a node of a computing environment such as depicted in FIG. 1. Environment 200 includes, for instance, a node 202 coupled to one or more networks 204. Although one node and one network are illustrated, it is well known that a computing environment can include many nodes and networks such as described above in connection with FIG. 1. Further, a particular node can be coupled to one or more other nodes via one network type, and further coupled to one or more other nodes via another network type, etc.

A node 202 includes an operating system 206, such as AIX. Operating system 206 includes, for instance, at least one communication device driver 208. The device driver is based on the type of adapter in the environment, such as SP switch-2, and it may manage one or more adapters 212.

Each network adapter is used to couple its associated node to a particular network, which corresponds to that adapter type. Network 204 includes any IP capable network, such as the Ethernet, Token Ring, FDDI, ATM, SP Switch, Fiber Channel, etc.

Before discussing particular processing embodiments in accordance with the present invention, various concepts thereof are explained below.

The present invention works with adapters (e.g., adapter 212 of FIG. 2) that connect computer hardware to, for example, a high speed network or switch. The configuration may have the following qualities.

The adapter can be on a high performance connection to other machines, for example, a connection on a high speed switch. In one aspect, the present invention can be used to insure that the high performance of the connection is not lost through the path length of switching between adapters.

The adapters are assumed to have a method of storing messages that are going to be sent, for example, in a first-in first-out queue (referred to as the FIFO). For simplicity in describing certain concepts of the present invention, the example of a FIFO with a head of FIFO pointer and tail of FIFO pointer is used.

Obtaining information from an adapter may be a slower operation than obtaining information from main computer storage. For example, obtaining the head of FIFO and tail of FIFO pointers from the adapter may be a slow operation.

An adapter may go down at any point while writing to it. When an adapter goes down, an interrupt is generated for the application indicating that the adapter has gone down. The adapter may then come up again at any point, generating another interrupt.

Messages are sometimes grouped together in the FIFO and then flushed to the network together for performance reasons. When some number of messages have been grouped together they are sent. This generally happens at a set interval, for example every fourth message. Sometimes a flush is forced by calling the write message function with a 0 length message. In this case, no new message is added, and the existing messages are flushed from the FIFO. If there are no new messages waiting to be flushed when a 0 length message is written, the 0 length message is ignored, so that no message is sent.

When messages are grouped together, it is sometimes advantageous to send as many of them as possible from the same FIFO. When messages are sent from different FIFOs they are more likely to arrive at the destination in a different order from the order in which they were sent. Since some applications work more quickly when messages are received in the order in which they were sent, the present invention preserves the order as much as possible.

Writing to a single adapter is a relatively straightforward operation. In order to write to a single adapter, a check is made that the adapter is up and that there is room in its associated FIFO. If both conditions are true, the next message is written to the adapter. Pseudocode for this operation is shown below.

```
If the adapter is up {
  If there is space in the adapter FIFO {
    write to the FIFO;
  }
}
```

The process becomes more complicated when multiple adapters are considered.

Figure 3A:
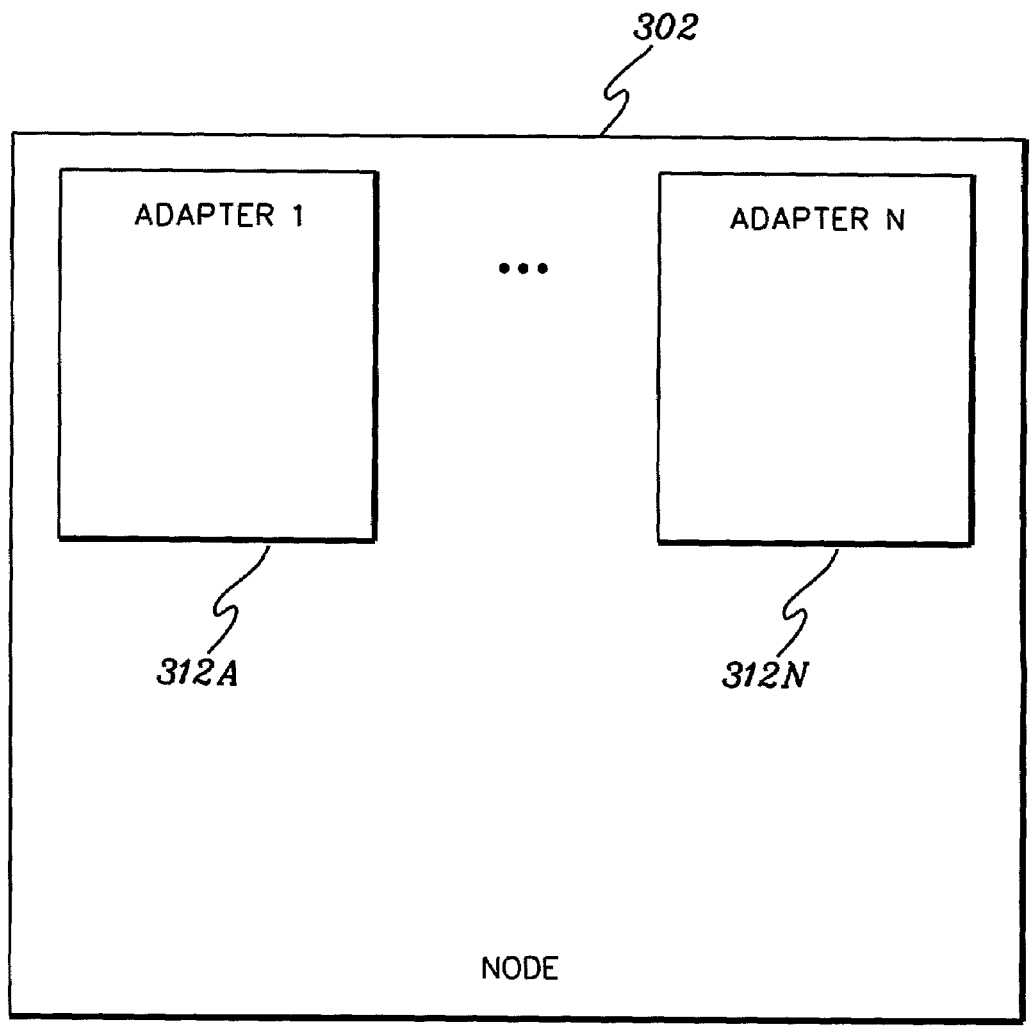
FIG. 3A depicts one embodiment of a switch node having N adapters to be used in writing messages to one or more switching units, in accordance with an aspect of the present invention.

FIG. 3A depicts one embodiment of a computing node 302 having multiple adapters 312a . . . 312n . . . , for example, for coupling the node to a high speed switch. When more than one adapter is used, the concept of a switch_count is introduced. The switch_count is an integer value that indicates that after a certain number of messages have been written to one adapter (switch_count messages), a switch is made to another adapter before writing a message. At least a switch_count number of messages are written to this other adapter before switching to yet another adapter.

The concept of a significant_difference_number is also employed representative of the difference between the amount of space in one adapter FIFO versus other adapter FIFOs. The significant_difference_number can be set to be any number desired, and it indicates that if some adapter FIFOs have more than significant_difference_number message slots available than other adapter FIFOs, then messages should be written to the FIFOs with the greater number of message slots. For example, if the significant_difference_number is 512, and certain FIFOs have 600 message slots available while others have 12 message slots available, most messages should be written to the FIFOs with 600 message slots. It is assumed that the FIFOs with greater space are able to send messages faster than the other FIFOs and thus should be written to more rapidly.

Provision for specifying a preferred adapter is also assumed. A preferred adapter indicates that if a specified adapter is up, it should be used and no switching between adapters should occur. When a preferred adapter is specified, the switch_count can be set to a very high value so that there is rarely an attempt to switch between adapters.

Figure 3B:
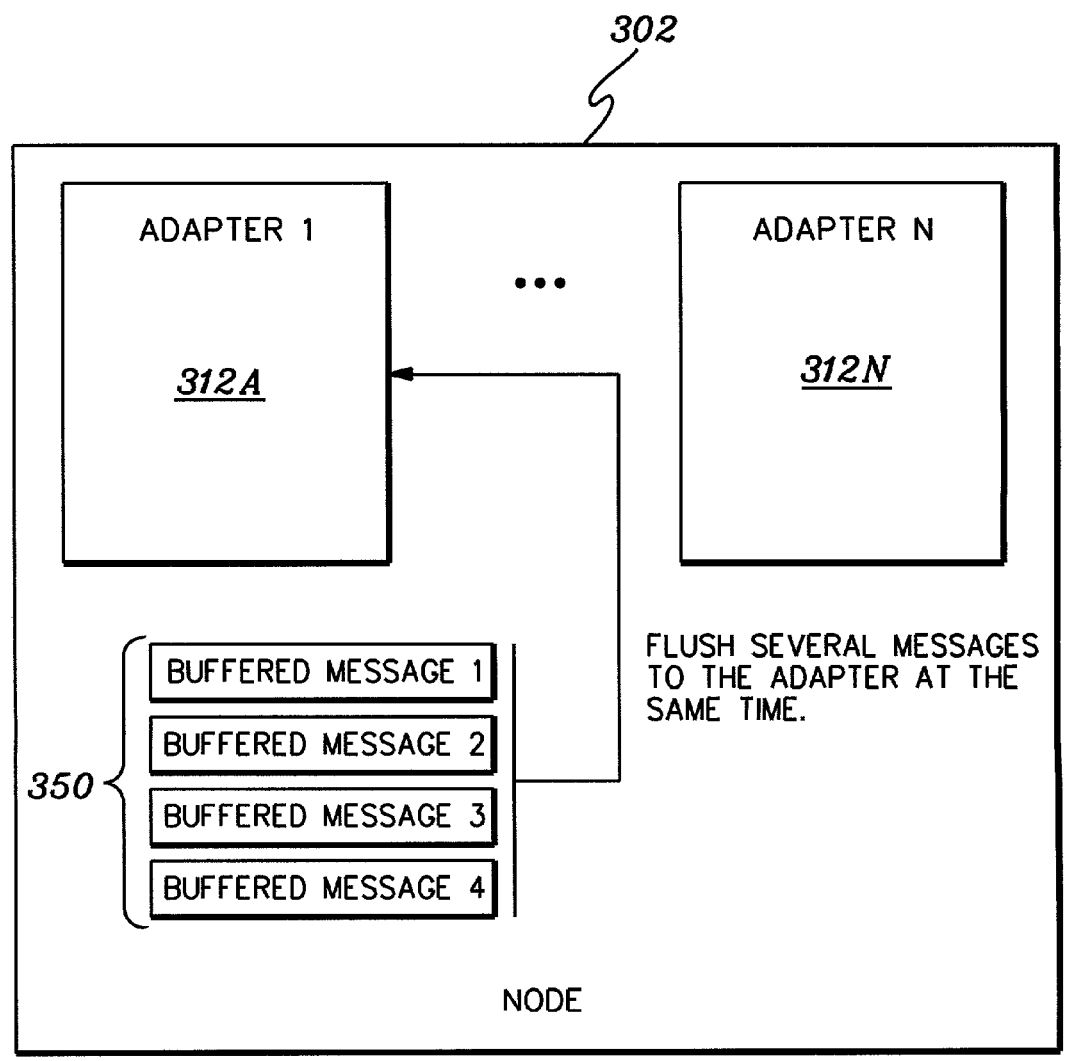
FIG. 3B depicts a more detailed embodiment of the switch node of FIG. 3A showing buffering of multiple messages at the switch node prior to writing thereof using an adapter of the multiple adapters, in accordance with an aspect of the present invention.

When messages are being grouped in a FIFO to be sent through an adapter, it is preferred that processing can only switch to another adapter when subsets of the group of messages are flushed. If the switch_count indicates that it is time to switch and a subset of the group has not yet been flushed, processing should wait until the subset is flushed before switching. Subsets of the group of messages are flushed at some predefined interval, for example, after every fourth message of the group of messages. FIG. 3B depicts computing node 302 having adapters 312a . . . 312n, with one or more of the adapters having an associated write FIFO 350. FIFO 350 is shown, by way of example, to include four buffered messages, which are assumed to be flushed together from the adapter in a write operation.

In order to have as many messages from each group sent on the same adapter (to preserve the order of the messages) adapters can be flipped at the start of every group of messages.

In view of the above, write pseudocode for one approach to writing a message when two adapters are used, is shown below.

```
If the message length is 0 {
  If there are unflushed messages in the previous adapter {
    Flush the messages;
  }
  return indicating the message was written;
}
If a preferred adapter was specified {
  If the preferred adapter is up and there are no unflushed
      messages in the non-preferred adapter {
    If there is space in the preferred adapter FIFO {
      Put the message into the preferred adapter FIFO;
    } else {
      return indicating that no write can occur;
    }
  }
}
If the message has not been written {
  If the (switch_count indicates we should try to write to
      the previous adapter and this is not the first write of
      a set of grouped messages) or if the there are messages
      to be flushed or if the other adapter is down or the
      other adapter's FIFO is full {
    If the previous adapter is up {
      If there is space in the previous adapter FIFO {
        Put the message into the previous adapter FIFO;
      } else if there are messages to be flushed {
        return indicating no write can be done;
      }
    }
  }
}
If the message has not been written {
  If the other adapter is up
    If there is space available in the other adapter FIFO {
```

```
    Put the message into the other adapter FIFO;
  } else {
    return indicating no write can be done;
  }
} else {
  return indicating no write can be done;
  }
}
if it is time to flush messages {
  flush the messages;
}
```

As shown above, there can be quite a few steps to execute when writing messages using multiple adapters. These steps are executed along critical performance paths and can cause an unacceptable performance slow down compared with the single adapter case. The problem becomes even worse when more than two adapters are used.

The invention presented herein avoids long path lengths by saving state information from previous tests, by taking advantage of the fact that the program is notified in an interrupt or signal handler when the adapter goes down, and by combining several tests into one. The processing discussed below takes advantage of the fact that in most cases the next message is written to the same adapter to which the previous message was written. This adapter is referred to herein as the "previous adapter" or the "previously used adapter". For example, if the switch_count is 32, then as long as there are enough message slots in the associated FIFO, we will prefer to write 32 messages to the previous adapter before a message is written to another adapter. Thus, one aspect of the present invention is to make the path length of writing to the previous adapter as short as possible, even if that makes the path length for switching between adapters a little longer. The shorter path length will be executed for the large majority of cases, and the longer infrequently. Test processing to determine when the previous adapter can be employed is referred to herein as the "simple set of tests" or "first set of tests", while test processing employed to select a potentially new adapter is referred to as the "more complicated set of tests" or "second set of tests".

Figure 4:
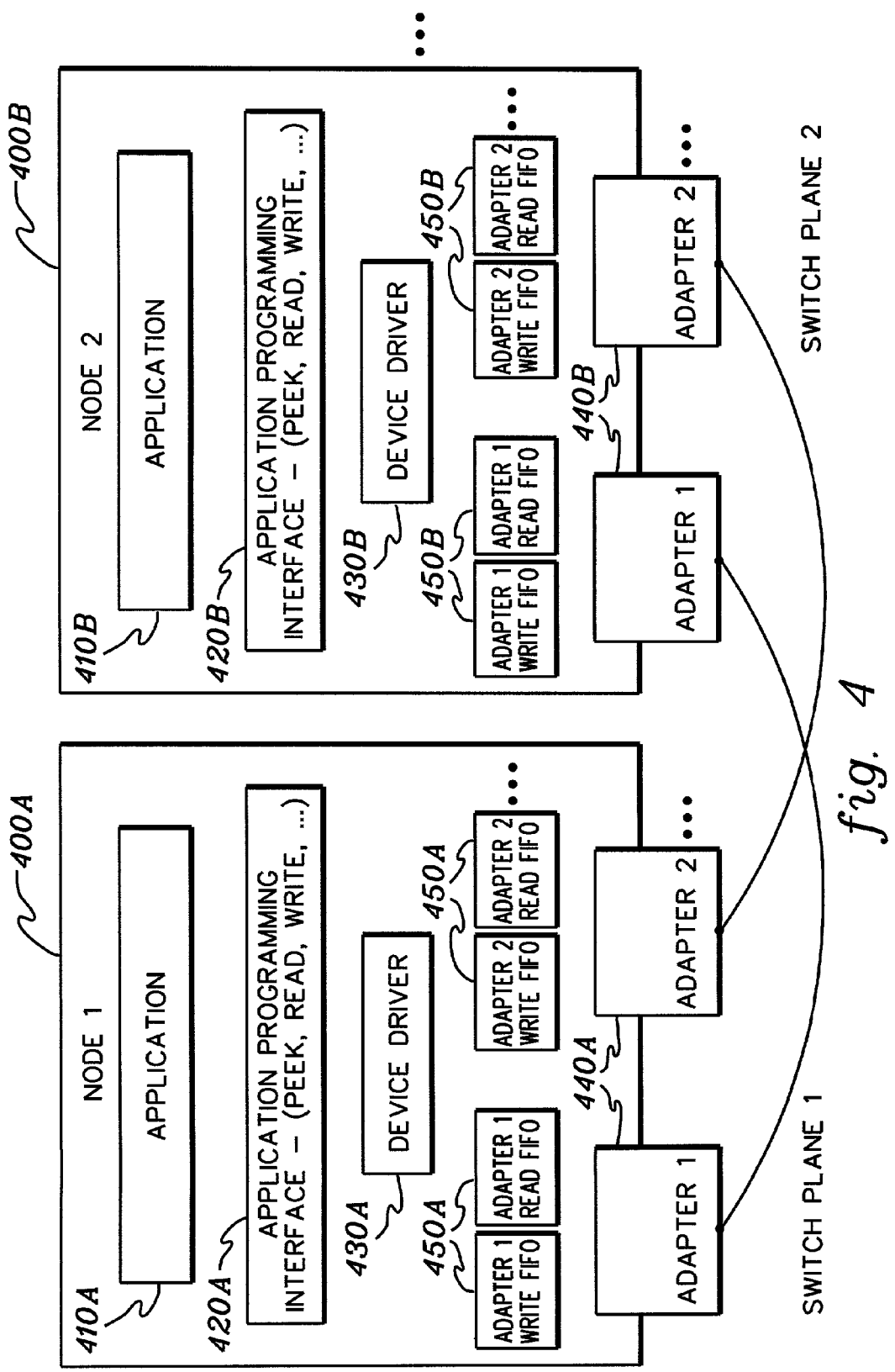
FIG. 4 depicts a more detailed example of one embodiment of a computing environment within which the processing control techniques described herein can be implemented, in accordance with an aspect of the present invention.

Before describing the test processing in detail, the environment of the invention is described in greater detail with reference to the distributed computing environment depicted in FIG. 4. As shown, multiple computing nodes 400A, 400B, . . . , each include a portion of an application 410A, 410B, . . . The respective applications employ application programming interfaces (APIs) 420A, 420B, . . . to call particular functions, such as the write function discussed herein (as well as the peek function and read functions described in the above-incorporated, co-filed application). The multinode network is connected by multiple high speed switches, such as the RS6000 SP switch marketed by International Business Machines Corporation. The multiple high speed switches define multiple switch planes, e.g., switch plane 1 & switch plane 2. Each computer is connected to the several switches using separate adapters 440A, 440B, . . . Device drivers 430A, 430B, . . . facilitate the reading and writing of messages through the respective adapters.

In the example shown, adapter 1 of each node is connected to switch plane 1, and adapter 2 of each node is connected to switch plane 2. When a message is written from one node to another node, the adapter that the message is sent through determines which adapter the data is received at. A message is received on the same adapter number that the message was sent on. So if a message is sent through adapter 1 on a first computing node, it will travel through switch plane 1 to adapter 1 on a second computing node.

In operation, the portion of the application and program running on a particular computing node writes messages through its respective API to other parts of the application running on other computing nodes. Similarly, the portion of the application on a receiving node reads messages from other parts of the application running on other computer nodes through its API.

Each adapter of each computing node has associated therewith a write FIFO and a read FIFO 450A, 450B, . . . These FIFOs are employed when writing and reading messages through the adapters. When an application writes a message, it calls its associated API to place the message into the write FIFO associated with the selected adapter. This FIFO has a fixed number of slots that can be filled by the API. When the adapter associated with the FIFO ascertains that a message is in the FIFO, the adapter sends the message over the switch plane in a first-in first-out order. If the write FIFO is full, the API detects this and tells the application. The application then waits until the adapter transfers a message out of the FIFO onto the switch before placing a new message into the FIFO. The adapter transfers a message from its associated FIFO onto the switch, and the message travels across the switch to other computing nodes. An adapter on another computing node connected to the particular switch plane receives the message and places it into its associated read FIFO.

The receiving application may then call the API peek function to see a part of the contents of the message in the read FIFO. A peek operation returns a part of a message without removing the message from the read FIFO. The receiving application may read the rest of the message using the API read function, which then removes the data from the read FIFO. Once the data is removed, the space on the read FIFO is available for a new message.

Within this environment, presented herein are various processing enhancements to facilitate enhanced processing performance of the multiple nodes using multiple adapters and their associated FIFOs. Unless otherwise specified, the adapter FIFO discussed herein refers to an adapter's write FIFO.

One piece of state information which can be saved is the count of how many message slots are available in the adapter FIFO. From the point of view of the write operation it does not matter if there is one or many message slots available in the FIFO. If there is at least one message slot, the message can be written to the adapter. To avoid reading information from the adapter with every message write, an avail_count can be saved in local storage of how many message slots are available in the FIFO. The available space (avail_count) can be decremented every time the FIFO is written to. The variable indicates that there are at least avail_count message slots available in the FIFO. The exact number of message slots will only need to be calculated when the avail_count is decremented to 0. This improves performance because determining the exact number of message slots available in the adapter's FIFO may be a considerably slower operation than simply decrementing the avail_count.

Part of the simple set of tests presented herein is to determine if the switch_count or the avail_count has reached 0. If either has, then the more complicated set of tests is performed to determine whether to switch adapters. In one implementation, there is no need to decrement both the switch_count and the avail_count every time a message is written. Rather a combined count, called send_test, can be employed. The send_test count is initialized to the smaller of the switch_count and the avail_count. Send_test is decremented every time a message is written. When it reaches 0, it indicates that either the switch_count or the avail_count would have reached 0 had they been decremented. Using send_test allows the processing discussed herein to decrement and test only one variable instead of two, thus shortening the path length of the shorter set of tests.

Unfortunately, switch_count could reach 0 when we are unable to switch because unflushed messages reside at the previous adapter. If switch_count reaches 0 and there are unflushed messages, the next message is sent to the previous adapter and switch_count is set to 1 so that it will be checked after the next message is sent.

Another feature of processing in accordance with the present invention is a test pointer to the previous adapter. If the pointer is NULL, it indicates that the previous adapter is not to be quickly selected, and the more complicated and relatively slower set of tests is to be used to select an adapter. If the pointer is not NULL, it indicates that the next message should be written to the previous adapter. This being the case, when the test pointer is not NULL, only two tests are needed to ascertain which adapter to write to, one to determine if the test pointer is NULL and the other to check if this is the first message in a group of messages where the order of the messages is to be preserved as much as possible. The pseudocode for this simple inquiry would be:

```
If the test pointer is set to NULL or if this is
    the first message in a group of messages where we want to
    preserve the order of the messages as much as possible {
    Do the more complicated and slower set of tests and set up
        to write to whichever adapter is appropriate;
} else {
    Set up to write to the previous adapter;
}
Write to the specified adapter;
```

As an example, there may be two times when the test pointer would be set to NULL. A first is when an indication comes in that the status of one of the adapters has changed (that is, an adapter has gone up or down). This is detected in an interrupt handler, and the pointer is set to NULL from that interrupt handler so that the next time a write operation is called the more complicated set of tests will be used. By setting the test pointer from an interrupt handler, path length is not added to the main line path of writing messages to the FIFO.

The setting of the test pointer in an interrupt handler does raise a timing issue which should be addressed. It is possible for the test pointer to be set in the interrupt handler at the same time that it is being set by the complicated set of tests. When this occurs, there is uncertainty whether the value from the interrupt handler or the value from the more complicated set of tests is the one that remains. The interrupt handler could set the test pointer to NULL only to have the more complicated set of tests set it to another value an instant later. In this case, the indication that the more complicated set of tests should be done the next time that the write is called could be lost. In order to handle this timing problem, the interrupt handler also may set a flag which indicates that the test pointer has been set from an interrupt handler. The more complicated set of tests will examine this flag to see if an interrupt occurred while it was setting the test pointer, and if it has, the test pointer is set to NULL. This will cause the more complicated set of tests to be used the next time that the write operation is called, and any effects of the interrupt will be handled. The more complicated set of tests may be used more often in this situation, but since this will happen infrequently, there is not a significant performance loss.

The second time the test pointer may be set to NULL is immediately after a message has been written. At this point send_test is decremented. If it is less than or equal to 0, the test pointer is set to NULL, indicating that the more complicated (and slower) set of tests is to be performed.

One embodiment of pseudocode for write adapter selection and use employing the simple set of tests is shown below.

```
If the test pointer is set to NULL or if this is
    the first message in a group of messages where we want
    to preserve the order of the messages as much as
    possible {
    Do the more complicated set of tests to determine which
        adapter we should write to;
} else {
    Set up to write to the previous adapter;
}
If the message length is 0 {
    flush any buffered messages;
} else {
    Write to the fifo that was chosen in the above tests;
    If it is time to flush the messages {
        flush the messages;
    }
    Decrement send_test;
    If send_test is less than or equal to 0 {
        If all messages have been flushed {
            Set the test pointer to NULL so the more complicated
                set of tests will be used for the next write;
        } else {
            if there is space on the current adapter for another
                write {
                /* Set up to check again for flushed messages after
                    the next write. */
                send_test = 1;
            } else {
                Set the test pointer to NULL so the more complicated
                    set of tests will be used for the next write;
            }
        }
    }
}
```

Notice that whether the previous adapter should be used for the next write is determined with only the additional path length of testing the test pointer, decrementing send_test, and testing the send_test.

One embodiment of pseudocode for the more complicated set of tests when two adapters are used is shown below.

```
Calculate the new value of the switch_count based on how
    much send_test has been decremented;
if the previous adapter is down {
    /* Since the previous adapter is down we will try to
        switch to the other adapter. */
    if the other adapter is down {
        /* We can not switch because neither adapter is up. */
        Return indicating the message can not be written;
    }
    Calculate the avail_count for the other adapter;
    if the other adapter has no room for new messages and we
        are not sending a 0 length message for the purpose of
        flushing {
        /* We can not switch because the other adapter is not
            available. */
        Return indicating the message can not be written;
    }
    Set up to write to the other adapter;
```

```
Set switch_count back to the number of messages that
    should be written before the next switch;
} else {
/* The previous adapter is up. We will determine if we
    should use it or the other adapter. */
Calculate the avail_count for the previous adapter;
if we are sending a 0 length message {
    /* We are just flushing and no message will be written.
    Use the previous adapter. */
    Set up to use the previous adapter;
} else if a preferred adapter is specified {
    /* Since a preferred adapter was specified we will try to
    write to it if possible. */
    if the preferred adapter is not the previous adapter {
        /* We have been writing to the non-preferred adapter.
        See if we can switch to the preferred adapter. */
        if the preferred adapter is down {
            /* We can't switch because the preferred adapter is
            down. */
            Set a temporary pointer to point to the previous
                adapter;
        } else {
            /* The preferred adapter is up. */
            Calculate the avail_count for the preferred adapter;
            if there is space available on the preferred adapter
                and there are no unflushed messages on the previous
                adapter {
                /* We can switch. */
                Set a temporary pointer to point to the preferred
                    adapter;
            } else {
                /* We can not switch yet. */
                Set a temporary pointer to point to the previous
                    adapter;
            }
        }
    } else {
        Set the temporary pointer to point to the previous
            adapter;
    }
    if the adapter pointed to by the temporary pointer has no
        space available {
        return indicating no message can be written;
    }
    Set up to write to the adapter pointed to by the
        temporary pointer;
    if the adapter pointed to by the temporary pointer is the
        preferred adapter or the preferred adapter is not up {
        Set switch_count back to its maximum value;
    } else {
        /* The preferred adapter is up but we can't switch to it
        yet. Set up to try again after the next message. */
        Set switch_count to 1;
    }
} else if there is space available in the previous FIFO
    and the switch_count is not 0 and this is not the
    first message in a group of messages where we want to
    preserve the order of the messages as much as
    possible {
    /* This is a fairly common path. The switch_count has
    not yet reached 0 and this is not the first message
    in a group of messages, so there is no reason to
    switch. We probably ended up in the more
    complicated set of tests because we needed to check
    to find out if the adapter had available space. */
    Set up to write to the previous adapter;
} else if there are unflushed messages {
    /* We can't switch now because there are unflushed
    messages. */
    if there is no space available on the previous
        adapter {
        /* We can't write another message because there is no
        space. A possible enhancement at this point would
        be to flush the messages and flip to the other
        adapter. Instead we will just give up. */
        return indicating a message can not be written;
    }
    if switch_count is 0 {
        /* Set up to check for flushed messages again the
        next time we write a message. */
        switch_count = 1;
    }
    Set up to write to the previous adapter;
} else {
    /* We may have to switch to the other adapter. */
    Calculate the avail_count for the other adapter;
    if the other adapter is down or there is no space on
        it {
        /* We can't use the other adapter. */
        if there is no space on the previous adapter {
            /* We can't use the previous adapter either. Give
            up. */
            return indicating no message can be written;
        }
        Set up to write to the previous adapter;
        Set switch_count to the number of messages that should
            be written before switching to the other adapter;
    } else if there is no space on the previous adapter {
        /* We can't use the previous adapter. We know we can
        use the other adapter because we checked to see if
        it was down or full above. */
        Set up to write to the other adapter;
        Set switch_count to the number of messages that should
            be written before switching to the other adapter;
    } else if there is significantly more space available
        in the previous adapter as compared with the other
        adapter {
        /* We won't switch because the other adapter seems to
        be much more busy than the previous adapter. */
        Set up to write to the previous adapter;
        Set switch_count to the number of messages that should
            be written before switching to the other adapter;
    } else {
        /* We have exhausted all of the tests. Switch to the
        other adapter. */
        Set up to write to the other adapter;
        Set switch_count to the number of messages that should
            be written before switching to the other adapter;
    }
}
if switch_count is less than avail_count for the chosen
    adapter {
    send_test = switch_count;
} else {
    send_test = avail_count;
}
If an adapter will be written to or messages will be
    flushed {
    Set the test pointer to point to the chosen adapter;
    if a concurrent interrupt has occurred {
        The interrupt may have occurred before we set the test
        pointer above, and so we may have written over what
        the interrupt handler did. Set the test pointer to
        NULL. Return a valid pointer however that can be used
        for the current write operation. Resetting the test
        pointer to NULL only affects the next write operation;
    }
}
```

If more than two adapters are used, the more complicated set of tests could be implemented as follows:

```
Calculate the new value of the switch_count based on how
    much send_test has been decremented;
if the previous adapter is down {
    /* Since the previous adapter is down we will try to switch
    to another adapter. */
    Find another adapter which is up, has space available, and
        which does not have significantly less space available
        than any other adapter;
    If no adapter could be found and the message length is
        not 0 {
        Return indicating the message can not be written;
```

```
}
Set up to write to the chosen adapter;
Set switch_count to the number of messages that should be
   written before switching to another adapter;
} else {
/* The previous adapter is up. We will determine if we
   should use it or another adapter. */
Calculate the avail_count for the previous adapter;
if we are sending a 0 length message {
/* We are just flushing and no message will be written.
   Use the previous adapter. */
Set up to use the previous adapter;
} else if a preferred adapter is specified {
/* Since a preferred adapter was specified we will try to
   write to it if possible. */
if the preferred adapter is not the previous adapter {
/* We have been writing to a non-preferred adapter.
   See if we can switch to the preferred adapter. */
if the preferred adapter is down {
/* We can't switch because the preferred adapter is
   down. */
Set a temporary pointer to point to the previous
   adapter;
} else {
/* The preferred adapter is up. */
Calculate the avail_count for the preferred adapter;
if there is space available on the preferred adapter
   and there are no unflushed messages on the previous
   adapter {
/* We can switch. */
Set a temporary pointer to point to the preferred
   adapter;
} else {
/* We can not switch yet. */
Set a temporary pointer to point to the previous
   adapter;
}
}
} else {
Set the temporary pointer to point to the previous
   adapter;
}
if the adapter pointed to by the temporary pointer has no
   space available {
return indicating no message can be written;
}
Set up to write to the adapter pointed to by the temporary
   pointer;
if the adapter pointed to by the temporary pointer is the
   preferred adapter or the preferred adapter is not up {
Set switch_count back to its maximum value;
} else {
/* The preferred adapter is up but we can't switch to it
   yet. Set up to try again after the next message. */
Set switch_count to 1;
}
} else if there is space available in the previous FIFO and
   the switch_count is not 0 and this is not the first
   message in a group of messages where we want to
   preserve the order of the messages as much as
   possible {
/* This is a fairly common path. The switch_count has not
   yet reached 0 and this is not the first message in a
   group of messages, so there is no reason to switch. We
   probably ended up in the more complicated set of tests
   because we needed to check to find out if the adapter
   had available space. */
Set up to write to the previous adapter;
} else if there are unflushed messages {
/* We can't switch now because there are unflushed
   messages. */
if there is no space available on the previous adapter {
/* We can't write another message because there is no
   space. A possible enhancement at this point would be
   to flush the messages and flip to another adapter.
   Instead we will just give up. */
return indicating a message can not be written;
}
if switch_count is 0 {
```

```
/* Set up to check for flushed messages again the
   next time we write a message. */
switch_count = 1;
}
Set up to write to the previous adapter;
} else {
/* We may have to switch to the other adapter. */
Find another adapter which is up, has space available, and
   which does not have significantly less space available
   than any other adapter. If possible this adapter
   should not be the previous adapter, but if it is the
   only one that qualifies it can be used;
If no adapter could be found {
Return indicating the message can not be written;
}
Set up to write to the chosen adapter;
Set switch_count to the number of messages that should be
   written before switching to another adapter;
}
}
if switch_count is less than avail count for the chosen
   adapter {
send_test = switch_count;
} else {
send_test = avail_count;
}
if an adapter will be written to or messages will be
   flushed {
Set the test pointer to point to the chosen adapter;
if a concurrent interrupt has occurred {
The interrupt may have occurred before we set the test
   pointer above, and so we may have written over what
   the interrupt handler did. Set the test pointer to
   NULL. Return a valid pointer however that can be used
   for the current write operation. Resetting the test
   pointer to NULL only affects the next write
   operation;
}
}
```

Figure 5A:
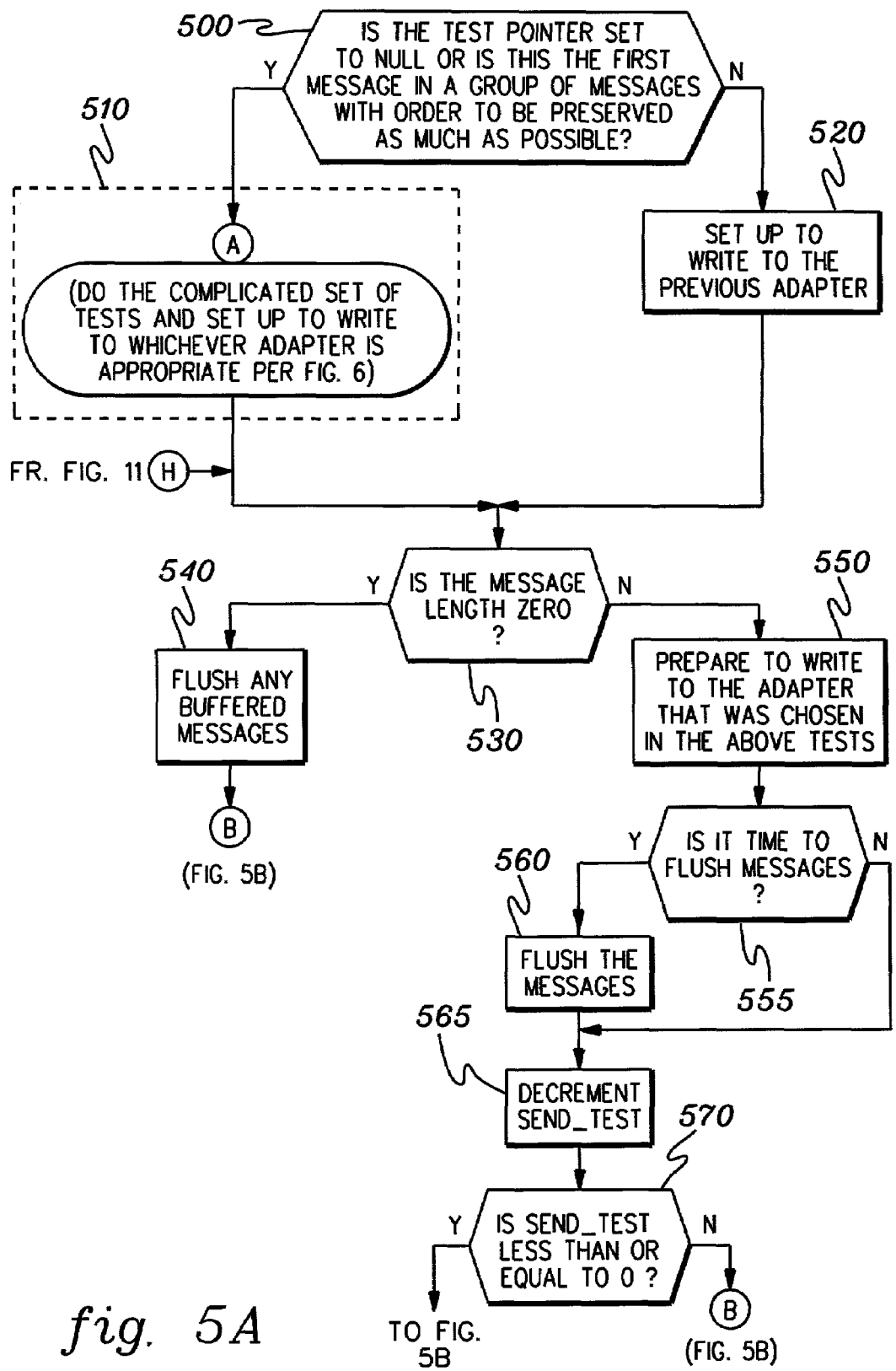
FIGS. 5A & 5B are a flowchart of one embodiment of a process for controlling selection of a write adapter using a first set of tests, in accordance with an aspect of the present invention.

FIGS. 5A–11 depict flowchart embodiments of the pseudocode processings set forth above. Specifically, FIGS. 5A & 5B represent an example of the first or simple set of tests which can be employed in certain situations for determining whether to continue to use the previous adapter, while FIGS. 6–11 represent one embodiment of the more complicated, second set of tests which can be used to determine a particular adapter to be employed when using two or more adapters, all in accordance with the present invention.

Figure 5B:
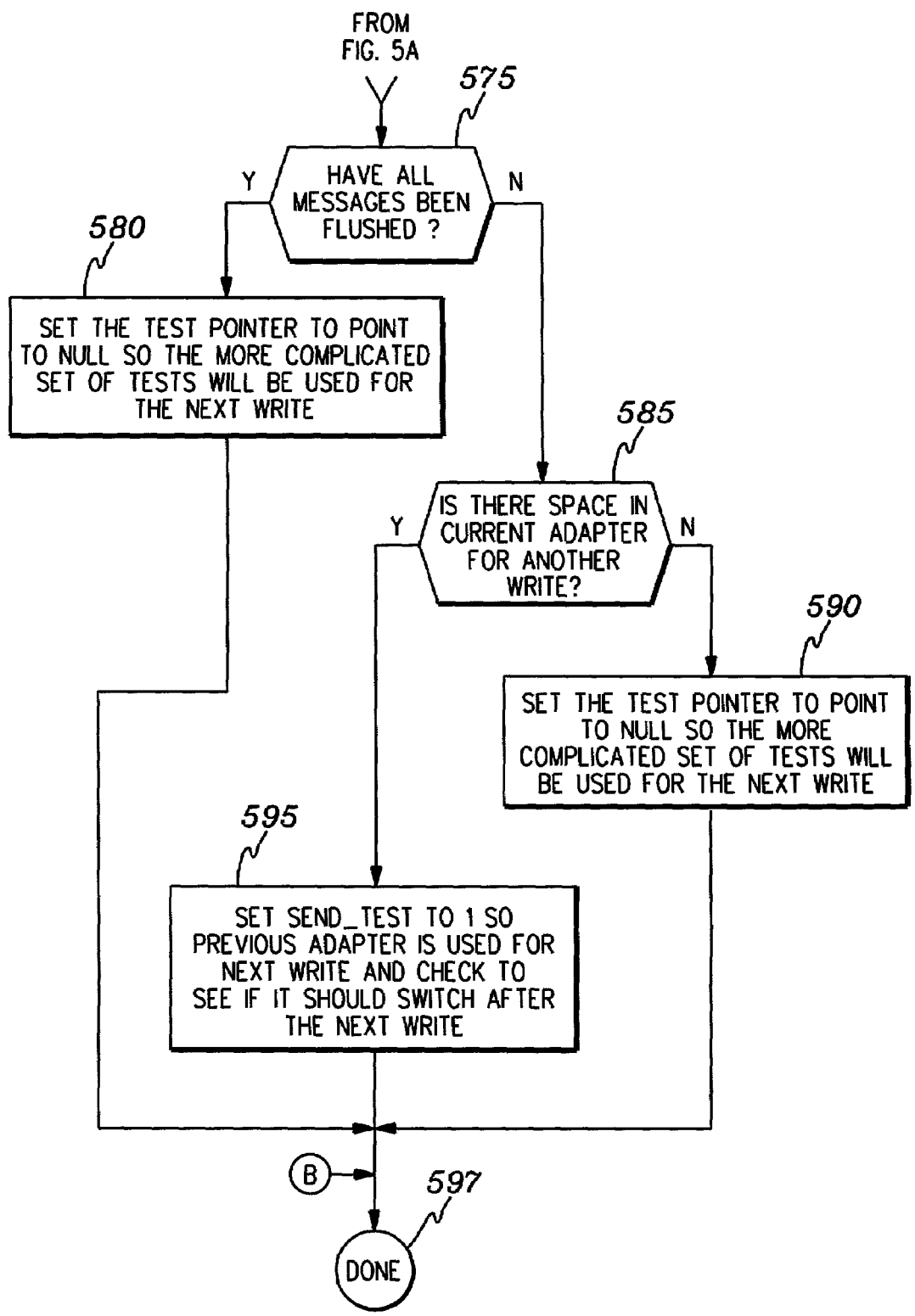

Beginning with FIGS. 5A & 5B, the more simple set of tests initially inquires whether the test pointer is set to NULL or the message to be written is a first message in a group of messages with order to be preserved as much as possible 500. If either condition is true, then the more complicated set of tests of FIGS. 6–11 is called 510. These two tests represent a quick analysis that is performed with each message write operation to determine whether the previously used adapter can continue to be used for the new write operation. As a default, the test pointer could be set to use the previous adapter. The test pointer is set to NULL if any of a group of conditions arises as explained hereinbelow. In such a case, the more complicated set of tests would be employed.

Assuming that the test pointer is set to other than NULL, and the message is not a first message in a group of messages with order to be preserved, then processing sets up to write the message to the previous adapter 520. Next, it is determined whether the message length is zero 530. As noted above, a message length of zero can be used as a signal to tell the API to flush the buffers in the adapter 540. After flushing any buffered messages, write operation processing is finished 597.

Assuming that the message length is other than zero, then processing prepares to write the message to the chosen adapter 550, and inquires whether it is time to flush messages from the chosen adapter 555. If so, the messages are flushed 560. Next, processing decrements the send_test counter 565. As noted above, the send_test counter is a variable which is initialized with a certain count equal to a number of messages that can be sent before processing needs to consider whether the message writes need to be flipped from the previous adapter. Next, processing determines whether the send_test count is less than or equal to zero 570. If no, processing is complete 597 since there is more room on the previous adapter's buffer for a next message.

If send_test is zero or less, then processing determines whether all messages have been flushed 575. If so, the test pointer is set to point to NULL so that the more complicated set of tests will be used for the next write operation 580, after which processing is complete 597. Otherwise, determination is made whether there is space in the current adapter for another write 585. If so, then send_test is set to one so that the previous adapter is used for the next write, and a check is made to see if an adapter switch should occur after the next write 595. If there is no space in the current adapter, then the test pointer is set to NULL so that the more complicated set of tests will be used for the next write operation 590.

Figure 6:
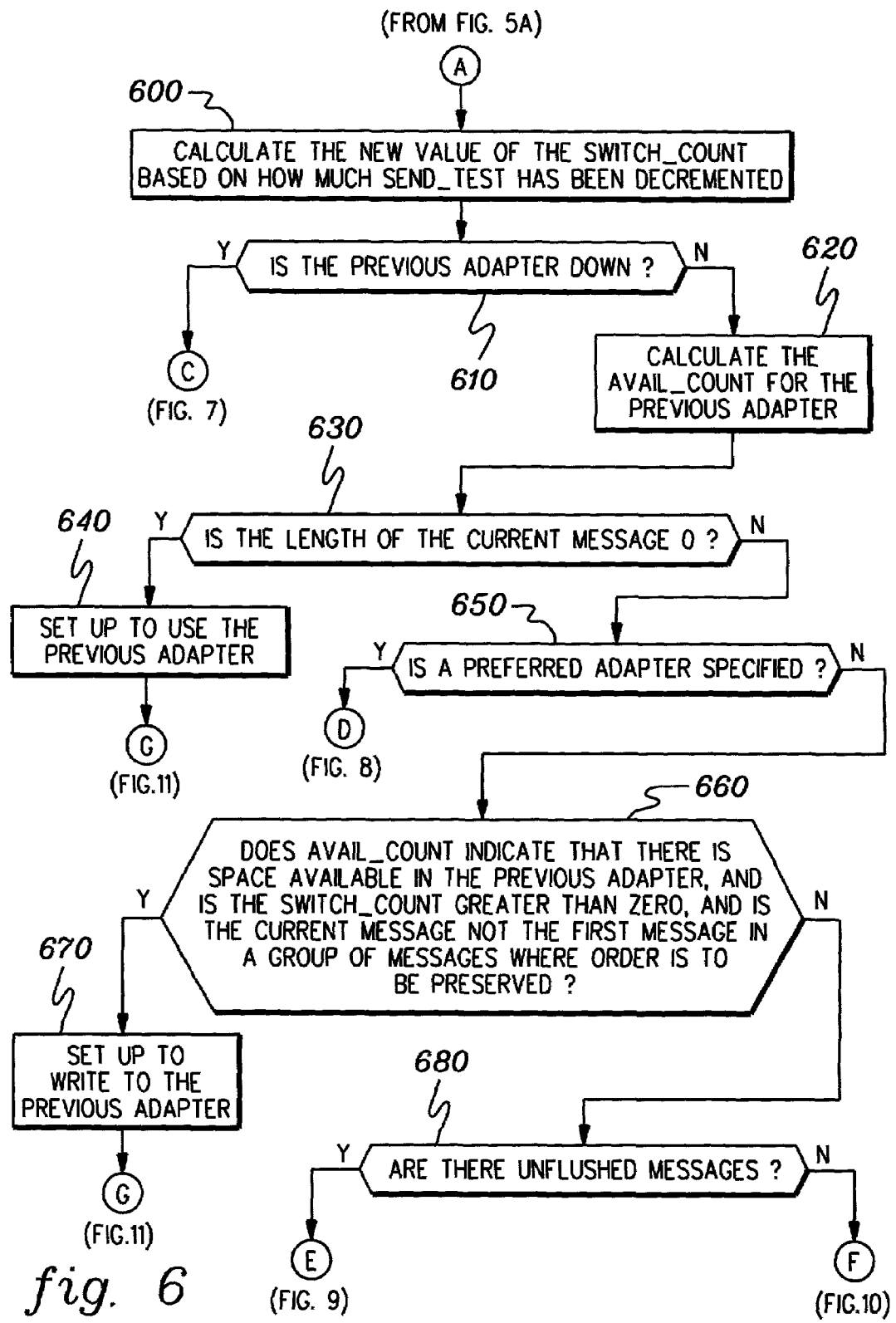
FIG. 6 is a flowchart of one embodiment of a more complicated process, employing a second set of tests, for selecting an adapter, wherein the process can be conditionally called from the processing of FIGS. 5A & 5B, in accordance with an aspect of the present invention.
Figure 7:
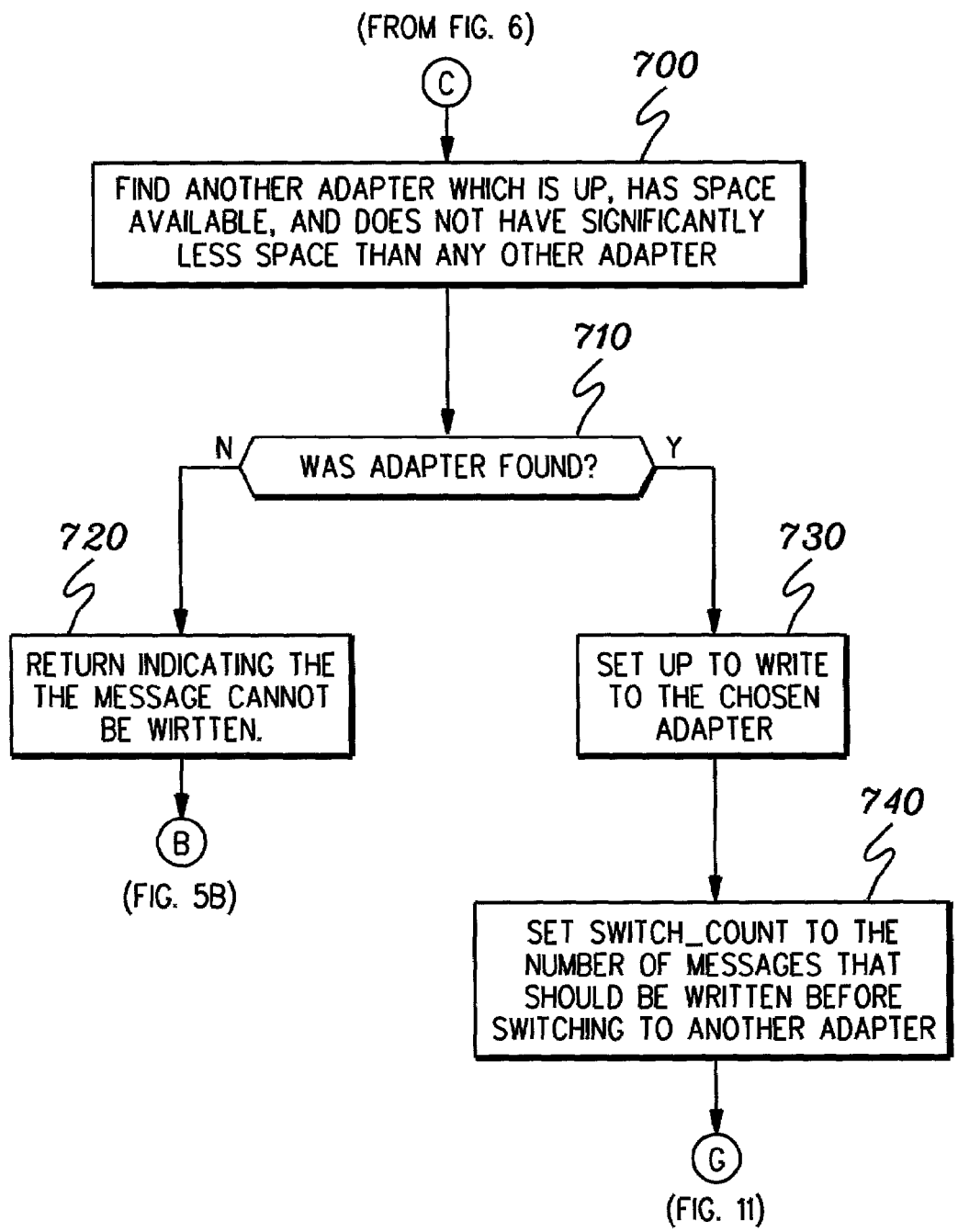
FIG. 7 is a flowchart of one embodiment of processing followed from the processing of FIG. 6 when the previously used adapter is down, in accordance with an aspect of the present invention.
Figure 9:
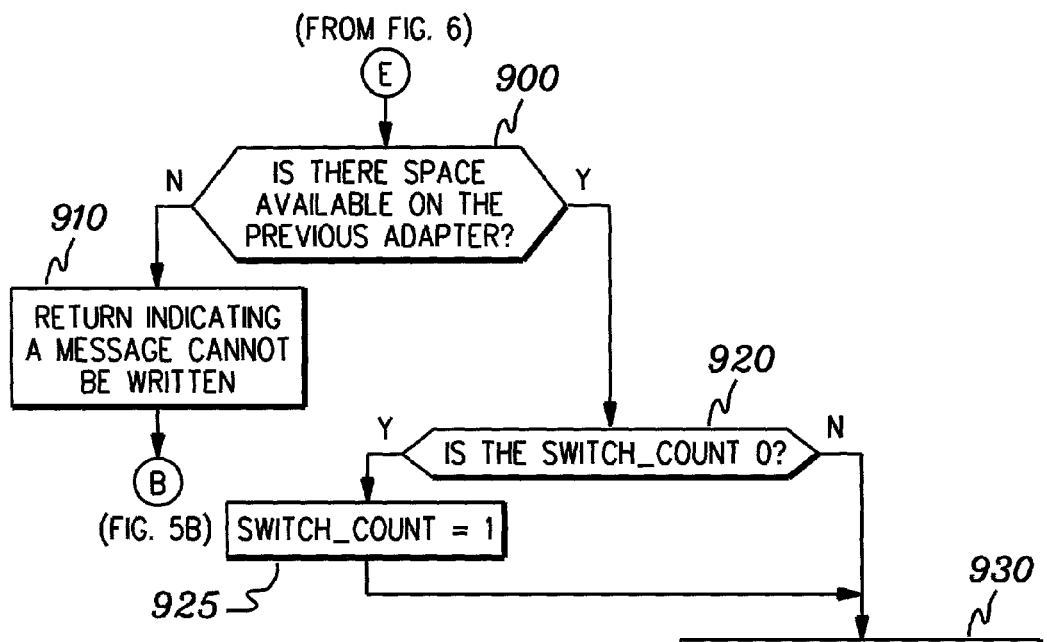
FIG. 9 is a flowchart of one embodiment of processing followed from the processing of FIG. 6 when the previously used adapter has unflushed messages, in accordance with an aspect of the present invention.
Figure 10:
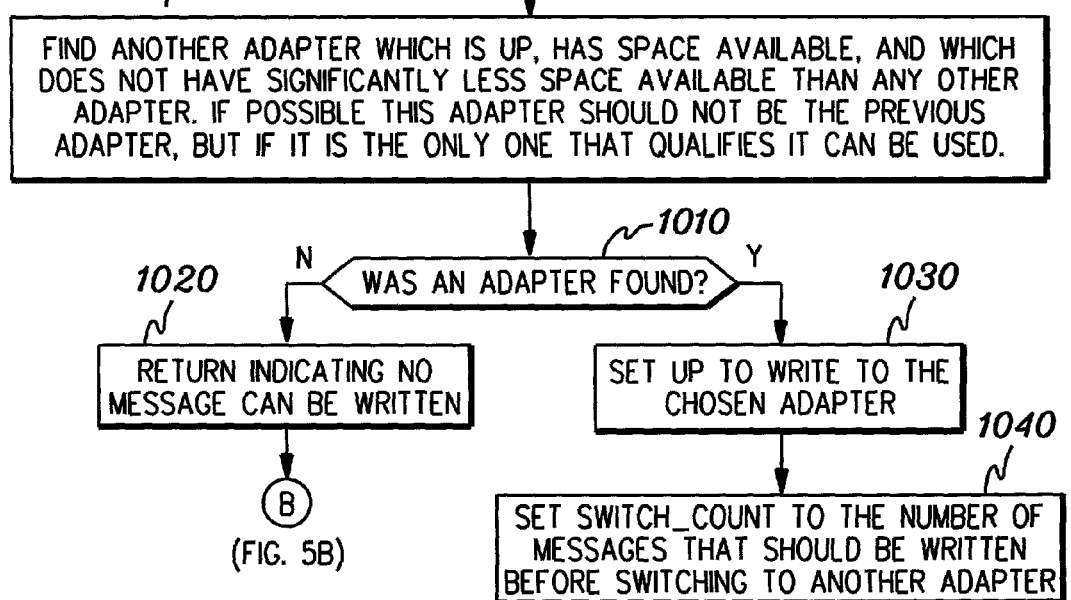
FIG. 10 is a flowchart of one embodiment of processing followed from the processing of FIG. 6 when there are no unflushed messages in the previously used adapter, in accordance with an aspect of the present invention.
Figure 11:
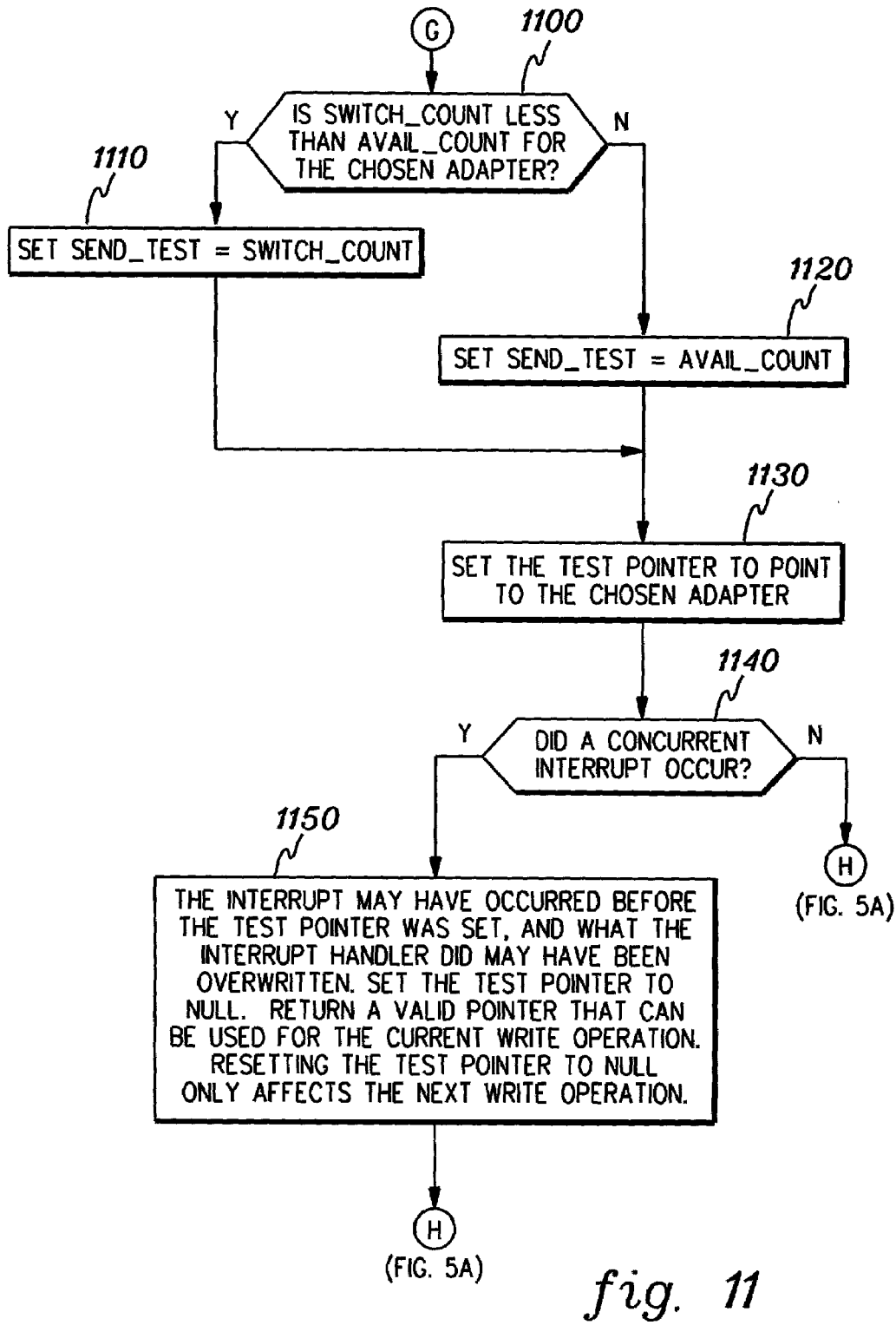
FIG. 11 is a flowchart of one embodiment of processing followed from the processing of FIGS. 6–10 for setting a send_test variable and setting the test pointer to the chosen adapter, in accordance with an aspect of the present invention.

As noted, the more complicated set of tests, represented by the processing embodiments of FIGS. 6–11, can be called from the processings of FIGS. 5A & 5B when inquiry 500 determines that the test pointer is either set to NULL or that the current message is a first message in a group of messages where order is to be preserved as much as possible. This more detailed processing begins by calculating a new value for switch_count based on how much send_count has been decremented 600. Processing then determines whether the previous adapter is down. If so, the processing of FIG. 7 is employed, otherwise the avail_count is determined for the previous adapter 620, and inquiry is made whether the length of the current message is zero 630. If so, the previous adapter is selected for use in the message write 640, and processing continues as shown in FIG. 11.

Figure 8:
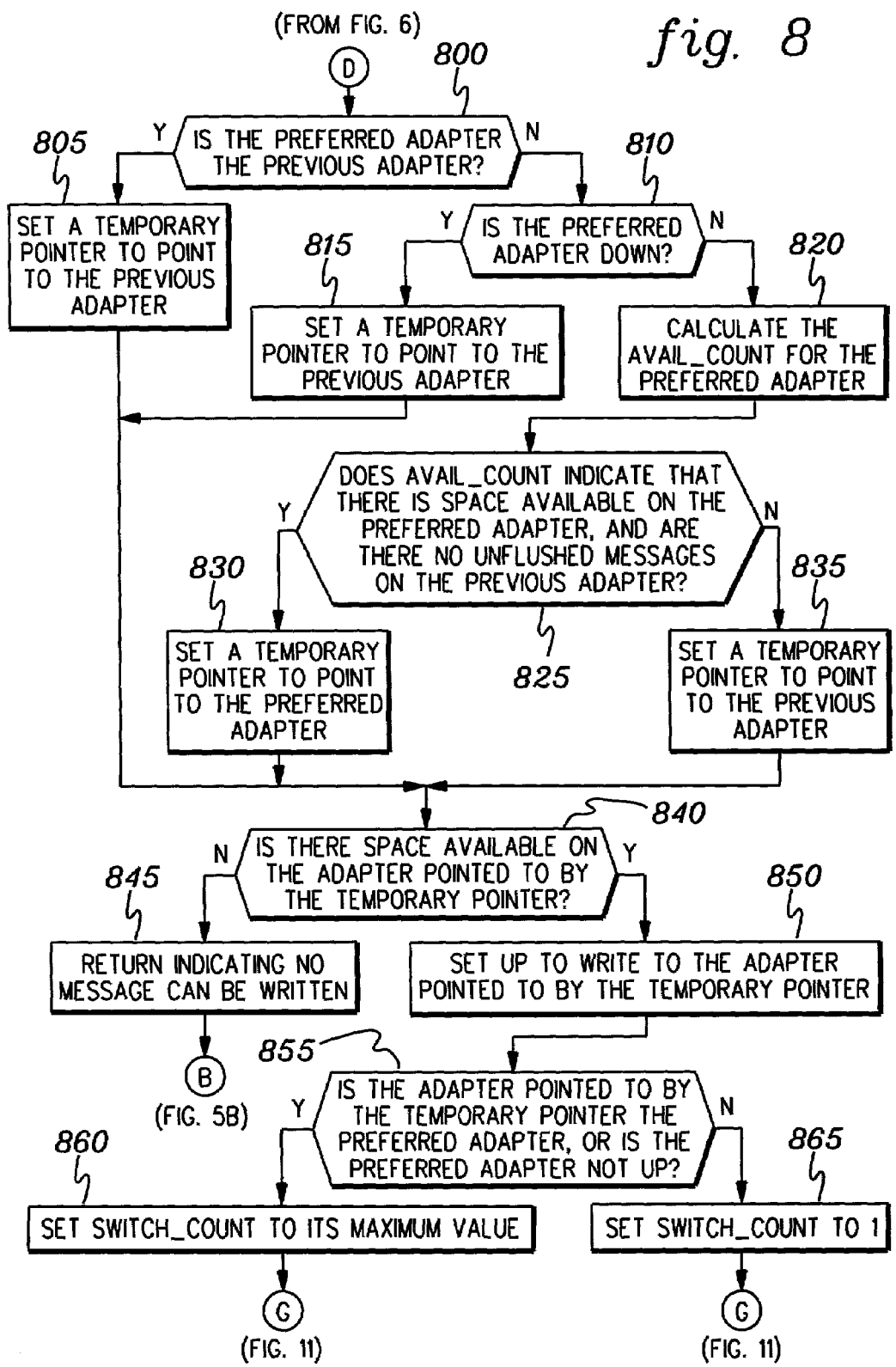
FIG. 8 is a flowchart of one embodiment of processing followed from the processing of FIG. 6 when a preferred adapter from multiple adapters is specified, in accordance with an aspect of the present invention.

If the current message length is other than zero, then processing determines whether a preferred adapter is specified 650. If so, then the processing of FIG. 8 is called. Otherwise, processing determines whether the avail_count variable indicates that there is space available in the previous adapter, determines whether the switch_count variable is greater than zero, and determines whether the current message is not the first message in a group of messages where order is to be preserved 660. If all conditions are true, then processing sets up to write to the previous adapter 670 and the processing of FIG. 11 is performed. Otherwise, processing determines whether there are unflushed messages 680. If so, then the process flow of FIG. 9 is followed, and if not, the process flow of FIG. 10 is followed.

As noted, the process of FIG. 7 is called from the processing of FIG. 6 when it is determined that the previously used adapter is down. FIG. 7 process flow begins by finding another adapter which is up, has space available, and does not have significantly less space than any other adapter 700. The amount of "significantly less space" can be selected as desired for a particular implementation. For example, if three adapters are employed, the previous adapter is down, and the third adapter has significantly less space available than second adapter, then the second adapter would be chosen. Processing then determines whether an adapter was found 710. If no, an indication is returned that the message cannot be presently written 720, and processing is finished 597 (FIG. 5B). If an adapter was found, then processing sets up to write to the chosen adapter 730, after which the switch_count is set to the number of messages that should be written before switching to another adapter 740, and the processing of FIG. 11 is performed.

FIG. 8, which is entered when the processing of FIG. 6 determines that a preferred adapter is specified, initially inquires whether the preferred adapter is the previous adapter 800. If so, then a temporary pointer is set to point to the previous adapter 805. Otherwise, processing determines whether the preferred adapter is down 810. Again, if so, the temporary pointer is set to point to the previous adapter 815. If the preferred adapter is up, processing calculates the avail_count for the preferred adapter 820, and determines whether the avail_count indicates that there is space available on the preferred adapter, as well as determining whether there are no unflushed messages on the previous adapter 825. If there is insufficient space on the preferred adapter or if there are unflushed messages on the previous adapter, then processing sets a temporary pointer to point to the previous adapter 835. Otherwise, the temporary pointer is set to point to the preferred adapter 830.

Processing next determines whether there is space available on the adapter pointed to by the temporary pointer 840. If no, then a message is returned indicating that the message cannot be presently written 845, and processing is complete 597 (FIG. 5B). If there is space available, processing sets up to write to the adapter pointed to by the temporary pointer 850. Next, a determination is made as to whether the adapter pointed to by the temporary pointer is the preferred adapter, or that the preferred not up 855. If either is true, then it is desirable that the selected adapter be used every time so that the switch_count is set to its maximum value 860 and processing continues with FIG. 11. Otherwise, a different adapter than the preferred adapter is being employed so switch_count is set to one 865 before proceeding with the processing of FIG. 11. By setting switch_count to one, processing indicates that the more complicated set of tests will again be performed the next time through the message write procedure.

The processings of FIGS. 9 & 10 are alternately followed from the process flow of FIG. 6 in response to determining whether there are unflushed messages 680. If so, then the processing of FIG. 9 is followed, otherwise the processing of FIG. 10 is followed. Beginning with FIG. 9, the flow initially determines whether there is space available on the previous adapter 900. If no, then a message is returned indicating that the message cannot be currently written 910 and processing is complete 597. If there is space available, then processing determines whether the switch_count equals zero 920. If so, switch_count is set to one 925. A switch_count greater than zero indicates that processing is to continue to write messages to the previous adapter for some number of times. Processing next sets up to write to the previous adapter 930, before proceeding with the process of FIG. 11.

Referring to FIG. 10, processing initially finds another adapter which is up, has space available, and which does not have any significantly less space than any other adapter 1000. If possible, this adapter should not be the previous adapter, but if the previous adapter is the only one that qualifies then that adapter can be used. Processing then determines whether an adapter was found 1010. If no, then an indication is returned that the message cannot be written 1020, after which processing is complete 597 (FIG. 5B). If an adapter was found, processing sets up to write to the chosen adapter 1030, and sets switch_count to the number of messages that should be written before switching to another adapter 1040. The processing of FIG. 11 is then performed.

FIG. 11, which represents a final clean-up process flow, is performed whenever the more complicated set of tests successfully selects an adapter. Processing initially determines whether switch_count is less than avail_count for the chosen adapter 1100. If so, then send_test is set to switch_count 1110. Otherwise, send_test is set to avail_count 1120. This processing essentially is setting send_test to the lesser of switch_count and avail count. Processing then sets the test pointer to point to the chosen adapter 1130, and inquires whether a concurrent interrupt occurred 1140. If not, processing returns to FIG. 5A at inquiry 530. Otherwise, an interrupt may have occurred before the test pointer was set, and what the interrupt handler did may have been overwritten. Thus, processing sets the test pointer to NULL and returns a valid pointer that can be used for the current write operation 1150. Resetting the test pointer to NULL only effects the next write operation. Thereafter, processing of the message write returns to FIG. 5A at inquiry 530.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of selecting an adapter of multiple adapters of a switch node for transmission of a message, said method comprising:

employing a first filter to initially test whether a previously used adapter of the multiple adapters should be used to send a message;

if the first filter fails to select the previously used adapter, then employing a second filter to determine which adapter of the multiple adapters should be used to send the message; and wherein the first filter comprises a first set of tests, the first set of tests comprising at least some of:

determining whether the previously used adapter has sufficient resources to handle the message at this time;

determining a switch count to ascertain whether the message should be sent through the previously used adapter;

ascertaining that the message is not a first message of a group of messages; and determining that the previously used adapter is currently operational.

2. The method of claim 1, wherein the first filter comprises a first set of tests, and wherein the second filter comprises a second set of tests, and wherein the second set of tests is more time consuming than the first set of tests.

3. The method of claim 1, wherein the first filter includes determining whether the previously used adapter has sufficient resources to handle the message at this time.

4. The method of claim 1, wherein the first filter comprises ascertaining a switch count to determine whether the message should be sent through the previously used adapter or whether a different adapter of the multiple adapters should be employed.

5. The method of claim 1, wherein the first filter comprises confirming that the message does not comprise a first message of a group of messages.

6. The method of claim 1, wherein the first filter comprises determining that the previously used adapter is currently operational.

7. The method of claim 1, wherein the first filter comprises determining that each test of the first set of tests is true, and if so, selecting the previously used adapter for transmission of the message without employing the second filter.

8. The method of claim 1, wherein the first filter comprises selecting the previously used adapter for transmission of the message unless at least one condition of multiple predefined conditions exists which dictates that the second filter is to be employed.

9. The method of claim 1, wherein the second filter comprises determining whether the previously used adapter is currently down, and if so, selecting another adapter of the multiple adapters which is operational, has space available, and does not have significantly less space than any other operational adapter of the multiple adapters.

10. The method of claim 9, wherein upon selecting another adapter for transmission of the message, the method further comprises setting a switch_count variable to a number of messages that should be written before switching to a new adapter of the multiple adapters.

11. The method of claim 9, wherein the second filter further comprises determining whether there is a preferred adapter for transmission of the message, and if so, determining availability of the preferred adapter.

12. The method of claim 9, wherein the second filter includes determining a lack of a preferred adapter, and if so, selecting the previously used adapter unless there is no available space in the previously used adapter, the switch count indicates it is time to switch to another adapter, or this is the first message in a group of messages, and there are no unflushed messages in the previously used adapter, in which case the method includes selecting another adapter which is operational, has space available, and does not have significantly less space available than any other adapter of the multiple adapters, wherein the previously used adapter is selected if it is the only adapter that fulfills these conditions.

13. The method of claim 1, further comprising employing a send_test variable, the send_test variable being initialized when a switch is made to a new adapter as the lesser of a count of message space available in the new adapter and a switch_count variable corresponding to a defined number of messages that should be written before switching to another adapter of the multiple adapters.

14. The method of claim 13, further comprising setting an adapter pointer to NULL whenever the send_test variable becomes less than or equal to zero, indicating that the second filter is to be employed.

15. The method of claim 14, further comprising setting the adapter pointer to NULL when the previously used adapter goes down, and returning a valid pointer that can be used for a current write operation.

16. A system for selecting an adapter of multiple adapters of a switch node for transmission of a message, said system comprising:
    means for employing a first filter to initially test whether a previously used adapter of the multiple adapters should be used to send a message;
    means for employing a second filter to determine which adapter of the multiple adapters should be used to send the message when the first filter fails to select the previously used adapter; and
    wherein the first filter comprises a first set of tests, the first set of tests comprising at least some of:
        means for determining whether the previously used adapter has sufficient resources to handle the message at this time;
        means for determining a switch count to ascertain whether the message should be sent through the previously used adapter;
        means for ascertaining that the message is not a first message of a group of messages; and
        means for determining that the previously used adapter is currently operational.

17. The system of claim 16, wherein the first filter comprises a first set of tests, and wherein the second filter comprises a second set of tests, and wherein the second set of tests is more time consuming than the first set of tests.

18. The system of claim 16, wherein the first filter includes means for determining whether the previously used adapter has sufficient resources to handle the message at this time.

19. The system of claim 16, wherein the first filter comprises means for ascertaining a switch count to determine whether the message should be sent through the previously used adapter or whether a different adapter of the multiple adapters should be employed.

20. The system of claim 16, wherein the first filter comprises means for confirming that the message does not comprise a first message of a group of messages.

21. The system of claim 16, wherein the first filter comprises means for determining that the previously used adapter is currently operational.

22. The system of claim 16, wherein the first filter comprises means for determining that each test of the first set of tests is true, and if so, for selecting the previously used adapter for transmission of the message without employing the second filter.

23. The system of claim 16, wherein the first filter comprises means for selecting the previously used adapter for transmission of the message unless at least one condition of multiple predefined conditions exists which dictates that the second filter is to be employed.

24. The system of claim 16, wherein the second filter comprises means for determining whether the previously used adapter is currently down, and if so, for selecting another adapter of the multiple adapters which is operational, has space available, and does not have significantly less space than any other operational adapter of the multiple adapters.

25. The system of claim 24, wherein upon selecting another adapter for transmission of the message, the system further comprises means for setting a switch_count variable to a number of messages that should be written before switching to a new adapter of the multiple adapters.

26. The system of claim 24, wherein the second filter further comprises means for determining whether there is a preferred adapter for transmission of the message, and if so, for determining availability of the preferred adapter.

27. The system of claim 24, wherein the second filter includes means for determining a lack of a preferred adapter, and if so, for selecting the previously used adapter unless there is no available space in the previously used adapter, the switch count indicates it is time to switch to another adapter, or this is the first message in a group of messages, and there are no unflushed messages in the previously used adapter, in which case the system further includes means for selecting another adapter which is operational, has space available, and does not have significantly less space available than any other adapter of the multiple adapters, wherein the previously used adapter is selected if it is the only adapter that fulfills these conditions.

28. The system of claim 16, further comprising means for employing a send_test variable, the send_test variable being initialized when a switch is made to a new adapter as the lesser of a count of message space available in the new adapter and a switch_count variable corresponding to a defined number of messages that should be written before switching to another adapter of the multiple adapters.

29. The system of claim 28, further comprising means for setting an adapter pointer to NULL whenever the send_test variable becomes less than or equal to zero, indicating that the second filter is to be employed.

30. The system of claim 29, further comprising means for setting the adapter pointer to NULL when the previously used adapter goes down, and for returning a valid pointer that can be used for a current write operation.

31. A system for selecting an adapter for transmission of a message in a distributed computing environment, said system comprising:
    a switch node of the distributed computing environment having multiple adapters, wherein the switch node is adapted to:
        employ a first filter to initially test whether a previously used adapter of the multiple adapters should be used to send a message;
        employ a second filter to determine which adapter of the multiple adapters should be used to send the message if the first filter fails to select the previously used adapter; and
        wherein the first filter comprises a first set of tests, the first set of tests determining at least some of:
            whether the previously used adapter has sufficient resources to handle the message at this time;
            a switch count to ascertain whether the message should be sent through the previously used adapter;
            that the message is not a first message of a group of messages; and
            that the previously used adapter is currently operational.

32. At least one computer program storage device readable by machine, tangibly embodying at least one program of instructions executable by the computer to perform a method of selecting an adapter of multiple adapters of a switch node for transmission of a message, the method comprising:
- employing a first filter to initially test whether a previously used adapter of the multiple adapters should be used to send a message;
- if the first filter fails to select the previously used adapter, then employing a second filter to determine which adapter of the multiple adapters should be used to send the message; and
- wherein the first filter comprises a first set of tests, the first set of tests comprising at least some of:
  - determining whether the previously used adapter has sufficient resources to handle the message at this time;
  - determining a switch count to ascertain whether the message should be sent through the previously used adapter;
  - ascertaining that the message is not a first message of a group of messages; and
  - determining that the previously used adapter is currently operational.

33. The at least one computer program storage device of claim 32, wherein the first filter comprises a first set of tests, and wherein the second filter comprises a second set of tests, and wherein the second set of tests is more time consuming than the first set of tests.

34. The at least one computer program storage device of claim 32, wherein the first filter includes determining whether the previously used adapter has sufficient resources to handle the message at this time.

35. The at least one computer program storage device of claim 32, wherein the first filter comprises ascertaining a switch count to determine whether the message should be sent through the previously used adapter or whether a different adapter of the multiple adapters should be employed.

36. The at least one computer program storage device of claim 32, wherein the first filter comprises confirming that the message does not comprise a first message of a group of messages.

37. The at least one computer program storage device of claim 32, wherein the first filter comprises determining that the previously used adapter is currently operational.

38. The at least one computer program storage device of claim 32, wherein the first filter comprises determining that each test of the first set of tests is true, and if so, selecting the previously used adapter for transmission of the message without employing the second filter.

39. The at least one computer program storage device of claim 32, wherein the first filter comprises selecting the previously used adapter for transmission of the message unless at least one condition of multiple predefined conditions exists which dictates that the second filter is to be employed.

40. The at least one computer program storage device of claim 32, wherein the second filter comprises determining whether the previously used adapter is currently down, and if so, selecting another adapter of the multiple adapters which is operational, has space available, and does not have significantly less space than any other operational adapter of the multiple adapters.

41. The at least one computer program storage device of claim 40, wherein upon selecting another adapter for transmission of the message, the method further comprises setting a switch_count variable to a number of messages that should be written before switching to a new adapter of the multiple adapters.

42. The at least one computer program storage device of claim 40, wherein the second filter further comprises determining whether there is a preferred adapter for transmission of the message, and if so, determining availability of the preferred adapter.

43. The at least one computer program storage device of claim 40, wherein the second filter includes determining a lack of a preferred adapter, and if so, selecting the previously used adapter unless there is no available space in the previously used adapter, the switch count indicates it is time to switch to another adapter, or this is the first message in a group of messages, and there are no unflushed messages in the previously used adapter, in which case the method includes selecting another adapter which is operational, has space available, and does not have significantly less space available than any other adapter of the multiple adapters, wherein the previously used adapter is selected if it is the only adapter that fulfills these conditions.

44. The at least one computer program storage device of claim 32, further comprising employing a send_test variable, the send_test variable being initialized when a switch is made to a new adapter as the lesser of a count of message space available in the new adapter and a switch_count variable corresponding to a defined number of messages that should be written before switching to another adapter of the multiple adapters.

45. The at least one computer program storage device of claim 44, further comprising setting an adapter pointer to NULL whenever the send_test variable becomes less than or equal to zero, indicating that the second filter is to be employed.

46. The at least one computer program storage device of claim 45, further comprising setting the adapter pointer to NULL when the previously used adapter goes down, and returning a valid pointer that can be used for a current write operation.

* * * * *